US006836763B1

(12) United States Patent
Munsil et al.

(10) Patent No.: US 6,836,763 B1
(45) Date of Patent: *Dec. 28, 2004

(54) BILLING SYSTEM AND METHOD

(75) Inventors: Wesley E. Munsil, Colorado Springs, CO (US); James R. Logan, Parker, CO (US); Alan W. Switzer, Broomfield, CO (US)

(73) Assignee: CSG Systems, Inc., Englewood, CO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 683 days.

(21) Appl. No.: 09/074,074

(22) Filed: May 7, 1998

Related U.S. Application Data (63) Continuation of application No. 08/790,490, filed on Jan. 29, 1997, now Pat. No. 5,692,438, which is a continuation of application No. 08/581,371, filed on Dec. 29, 1995, now abandoned.

(51) Int. Cl.[7] .............................................. G06F 17/60
(52) U.S. Cl. ............................. 705/34; 705/1; 705/27; 705/28; 705/36; 705/406; 283/58; 229/14; 707/102; 709/202
(58) Field of Search .......................... 705/1, 34, 3, 21, 705/27, 28, 45, 36, 406; 229/314; 283/58; 455/186.1; 707/102; 709/202

(56) References Cited

U.S. PATENT DOCUMENTS

| | | | | |
|---|---|---|---|---|
| 3,558,041 A | * | 1/1971 | Buescher | 229/314 |
| 5,121,945 A | * | 6/1992 | Thomson et al. | 283/58 |
| 5,177,687 A | * | 1/1993 | Baggarly et al. | 705/406 |
| 5,319,543 A | * | 6/1994 | Wilhelm | 705/3 |
| 5,835,856 A | * | 11/1998 | Patel | 455/406 |
| 5,852,811 A | * | 12/1998 | Atkins | 705/36 |
| 5,943,656 A | * | 8/1999 | Crooks et al. | 705/30 |

FOREIGN PATENT DOCUMENTS

| | | | | |
|---|---|---|---|---|
| WO | WO 91/03023 A1 | * | 3/1991 | G06F/15/30 |
| WO | WO 96/38018 A1 | * | 11/1996 | H04Q/11/04 |

OTHER PUBLICATIONS

IFRA '95, Part II: System vendors boost productivity without Word and Quark. (European publishing systems trade show) (Industry Trend or Event). Tribute, Andrew et al., Sybold Report on Publishing Systems, v25, n6, p3 (29) Nov. 3, 1995.*

Commun ications services: mail services for hire. (includes related article on suitability to task ratings) (four business communications services reviewed). Gonzalez, Sean. PC Magazine, v14, n8, p177 (3, Apr. 25, 1995.*

Groupware: Are we ready? (includes related articles on the programs' suitability to task, the types of groups the programs serve, WordPefect Office 4.0, Microsoft Windows, Workgroups 3.1 and DEC's TeamLinks 1.1), PC Mag., v12, n11, p267(17), Jun. 15, 1993.*

Bearing the standard. (the need for programming standards). Hurst, Mark. EXE, v6, n1, p28 (2), Jun. 1991.*

* cited by examiner

*Primary Examiner*—Tariq R. Hafiz
*Assistant Examiner*—M. Irshadullah
(74) *Attorney, Agent, or Firm*—Gary R. Jarosik (57) ABSTRACT

A bill editor, generator, messaging and insert system and method comprises a portion of a bill production processor designed to create monthly billing statements which are sent to customers and which detail charges incurred over the course of a billing cycle. The bill editor and generator allows billing personnel to design a bill using static text, dynamic text and paragraph areas. Once the report/bill is defined, the report definition is stored in temporary memory for later use. The report definition file defines how the report is to appear and where the data used in the report is stored. The report generator, when subsequently run, uses the predefined report definition to retrieve data from the database and generates the report as defined by the report definition file. The bill messaging and insert system determines, based on assigned priority, criteria and weight and space limitations, the messages and notices to be included in a customer billing statement.

3 Claims, 7 Drawing Sheets

Example 1:
The simplest report you'll ever need.

FIG. 4

| CODE | DESCRIPTION |
|---|---|
| ADULT | Adult |
| ADVEN | Adventure |
| CHILD | Children |
| CNCRT | Concert |
| COMDY | Comedy |
| DRAMA | Drama |
| EDUC | Education |
| FAM | Family |
| HORR | Horror |
| MUSCL | Musical Story |
| SPORT | Sports |

BILLING SYSTEM AND METHOD

This application is a continuation of application Ser. No. 08/790,490, filed Jan. 29, 1997 now U.S. Pat. No. 5,692,438 which is a continuation of application Ser. No. 08/581,371, filed Dec. 29, 1995, now abandoned.

RELATED APPLICATIONS

This application is related to U.S. patent application Ser. No. 08/579,371, entitled "Billing Statement Rendering System and Method", filed on Dec. 27, 1995, and U.S. patent application Ser. No. 08/405,766, entitled "Method and Apparatus for Transaction Processing in a Distributed Database System" filed Mar. 17, 1995, both of which are hereby incorporated by reference.

TECHNICAL FIELD OF THE INVENTION

This invention relates in general to the field of data communication and more particularly to a system and method for the production of billing statements.

BACKGROUND OF THE INVENTION

Service and product providers must bill their customers. To do so, these service and product providers, such as cable television operators, local telephone service providers, long distance telephone providers, and credit card companies, must produce periodic billing statements for each of their customers. In the case of a cable television operator, each customer receives a monthly billing statement. A single cable television company may operate numerous cable television franchises in several geographic regions, covering millions of customers. Each of these customers receives a billing statement each month.

Billing statements are often printed and mailed by bill renderers, which a service provider, such as a cable television operator, will contract to produce its billing statements. In this arrangement, the service provider often furnishes the bill renderer with the customer data to be printed on the billing statements.

Prior to printing the bills, they must be generated, edited and appropriately messaged. As far as generating the bills are concerned, it is necessary to determine where on the customer billing statement the various textual information is to appear. Ideally, the service or product provider would like to have the flexibility to change the format of the billing statement without having to physically type the textual information from scratch upon each change in the bill run format. Billing and reporting information traditionally has been presented in a format with little or no flexibility for altering, without significant effort, the presentation of the information appearing on the bill or report.

As far as bill messaging is concerned, it is necessary to include a variety of messages, notices and inserts with the bill. However, there are limitations on how much material may be included on a standardized billing statement, which usually consists of a perforated sheet of paper, a portion of which is returned with payment. When all of the messages will not fit on the available space on the bill, some of the messages are merely omitted, regardless of priority or importance. There is no known system for prioritizing the universe of messages that could appear on a bill and then print them on the available space according to their priority. In addition, there are weight considerations which must be observed to avoid having the customer billing statement exceed the cost of first class postage.

These and other considerations are addressed by the bill generator, editor and messaging system and method according to the preferred embodiment.

SUMMARY OF THE INVENTION

It an object of the present invention to provide a bill editor and generator which is flexible in its ability to modify the format of the customer billing statement.

It is a further object of the present invention to provide a bill editor and generator which facilitates the process of bill editing and generating.

It is a further object of the present invention to provide a bill messaging system which prints notices and messages on a customer billing statement according to a predetermined priority in the space allocated on the billing statement for such notices and messages.

It is a further object of the present invention to provide a bill insert system which provides inserts to the customer billing statement according to a predetermined priority without exceeding the cost of the prevailing weight limit of the preferred postal class.

These and other objects of the invention are accomplished by a report/bill editor and generator and messaging system and method of the preferred embodiments. The terms bill and report are used interchangeably and should be understood as such. The bill/report editor and generator system and method comprises a single module in the bill production processor. The report editor is a graphical editor which allows a report designer to use a palette of tools to customize where data is to appear on a report or bill. The report designer will decide how the report/bill will generally appear, and using the tools, create a graphical layout of where the textual information will physically appear on the report. The report editor accesses database catalogs which contain table names, table column names and stored procedures. The report generator facilitates generation of reports.

The report designer has at least three types of tools to generate the report's layout, static text tools, dynamic text tools and paragraph areas. Static text refers to elements such as labels and heading appearing in the report and their geometries and contents as well. Dynamic text refers to data retrieved from the database. The dynamic aspects of the report editor and generator refer to the order in which the paragraphs are to be generated in the report, and the stored procedures used to retrieve the data. Finally, paragraphs and paragraph areas refer to areas allocated on the report where repetitive information is to appear. Once defined, paragraphs describe the mutual containment relationships of text.

Once the report editor has defined the layout of a report, a report definition file (RDF file) is stored in temporary memory. At some time in the future, the report may be run by a report generator program. The report generator program reads the RDF file from temporary memory. The RDF file describes how the report is to appear, where the data is stored and where it is supposed to draw the data on the report. The report generator queries the database under the control of the RDF file. The report generator pulls the data specified by the RDF file, and prints it in the manner specified by the RDF file. The report generator, on user demand, uses a report definition to get data from the database (and the user, if necessary) and generates the report defined by the report definition. The report generator can generate the report in any of the typical places supported on the native platform: screen, paper or disk. In other words, the user can specify that instead of printing the information on paper, it can be drawn in a window on a computer screen, or written to a file on a disk, which can be accessed at a later time without having to go back to the database.

The bill message, notice and insert system and method comprises a bill definition portion followed by a bill run portion. The bill definition portion comprises a series of definitions which are input by the billing personnel whereas the bill run portion determines which messages, notices and inserts eventually make it into the customer billing statement. More particularly, in the bill definition portion, the billing personnel define the universe of available messages for a given billing cycle. The billing personnel also identify a universe of inserts available for the billing cycle. Each insert has a known weight. Next, the billing personnel define the criteria of information to be included on the bill. This could include account information, collections history, product history, etc. Next, the billing personnel assign a priority to each of the messages, notices and inserts. In other words, the billing personnel interact with a system to specify the types of messages, the criteria of information to be included in that particular bill run and the associated priority of the messages and notices. The system then processes this information in the bill run portion to generate a bill which conforms to the weight and space limitations of the customer billing statement.

More particularly, the bill run portion of the system then qualifies each message, notice and insert against stored information about each customer. Only messages, notices and inserts relevant to a particular customer qualify for that customer. The qualifying messages and notices are stored in temporary memory. Then, all of the qualifying messages and notices are arranged according to priority, and only those that fit on the bill are eventually printed. At the same time, all of the qualifying inserts are stored in temporary memory. Only those inserts which, according to the predetermined insert priority, will make the final bill equal to or less than the weight limit of the preferred postal class are included in the customer billing statement.

Other objects, features and advantages of the preferred embodiments will become apparent when the detailed description is read in conjunction with the accompanying drawings.

DETAILED DESCRIPTION OF THE PREFERRED EMBODIMENTS

A service or product provider, such as cable television providers, local telephone service providers, long distance telephone providers, and credit card companies, store customer data on one or more databases within a customer management system. The customer management system manages the data comprising each customer account. As a customer's account changes over time, as a result of, for example, service and product orders and deletions, the customer management system updates the customer data so that an accurate current and historical record is maintained of each customer's account history.

Figure 1:
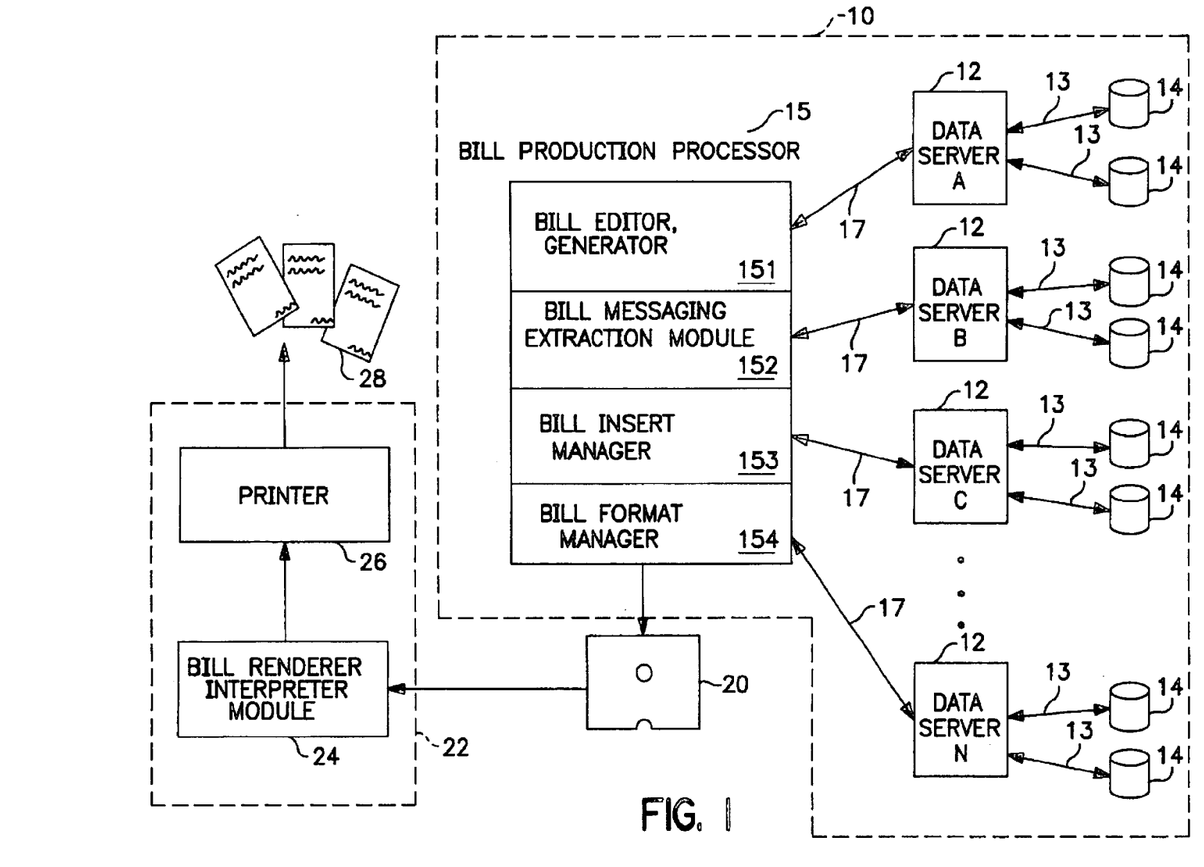
FIG. 1 is a graphical representation of the preferred embodiment system of the present invention indicating the data flow of the generation, messaging and printing of a billing statement.

FIG. 1 is a graphical representation of a customer management system 10 of a service provider. A customer management system may include one or more data servers 12 connected across one or more communications links 13 to one or more customer databases 14. Databases 14 may be all located in one physical location or may be located in separate physical locations. Each of data servers 12 is connected across one or more communications links 17 to a bill production processor 15, which processes and handles the customer data maintained in customer management system 10.

The bill production processor system 15 of the present invention includes a bill editor and generator module 151, a bill messaging extraction module 152, a bill insert manager module 153 and a bill format manager module 154. All the customers of a service provider are not billed at the same time each month. A service provider will often bill its customers on a rolling monthly schedule so that different sets of customers, perhaps differentiated by geographic region, are each billed during different periods of each month. At the time of the month that a given set of customers is to be billed, bill production processor 15 extracts from customer databases 14 the customer data that is to be printed on the billing statements provided to the billed customers.

The input to the bill format manager module 154 is the unformatted customer data for each customer to be billed. The unformatted customer data provided at the output of bill format manager module 154 includes account status information, customer address information, account balance information, legal notices, promotional notices, and other data for each of the customers to be billed.

Bill format manager module 154 receives the unformatted customer data from modules 151, 152, 153 and converts this data according to a bill renderer definition format. The output of bill format manager module 154 is the formatted customer data for the set of customers to be billed. The output of bill format manager module 154 is saved in a formatted customer billing file 20, which may be any suitable storage medium, including a tape, disk, or optical storage medium. Formatted customer billing file 20 contains the formatted customer data for each of the customers to be billed.

Formatted customer billing file 20 is provided to one of any number of available bill renderers 22. A bill renderer interpreter module 24 (1) interprets the syntax of formatted customer billing file 20, which is formatted according to the bill renderer definition format, (2) extracts the customer data from formatted customer billing file 20, and (3) sends the interpreted and extracted data to a printer 26, which prints a series of customer billing statements 28.

The output of bill format manager module 154 is formatted according to the bill renderer definition format. The bill renderer definition format provides a simple format for the service provider's customer data. The bill renderer definition format of the present invention is easily interpretable by the bill renderer interpreter module 24 of each of the service provider's bill renderers 22.

Figure 2:
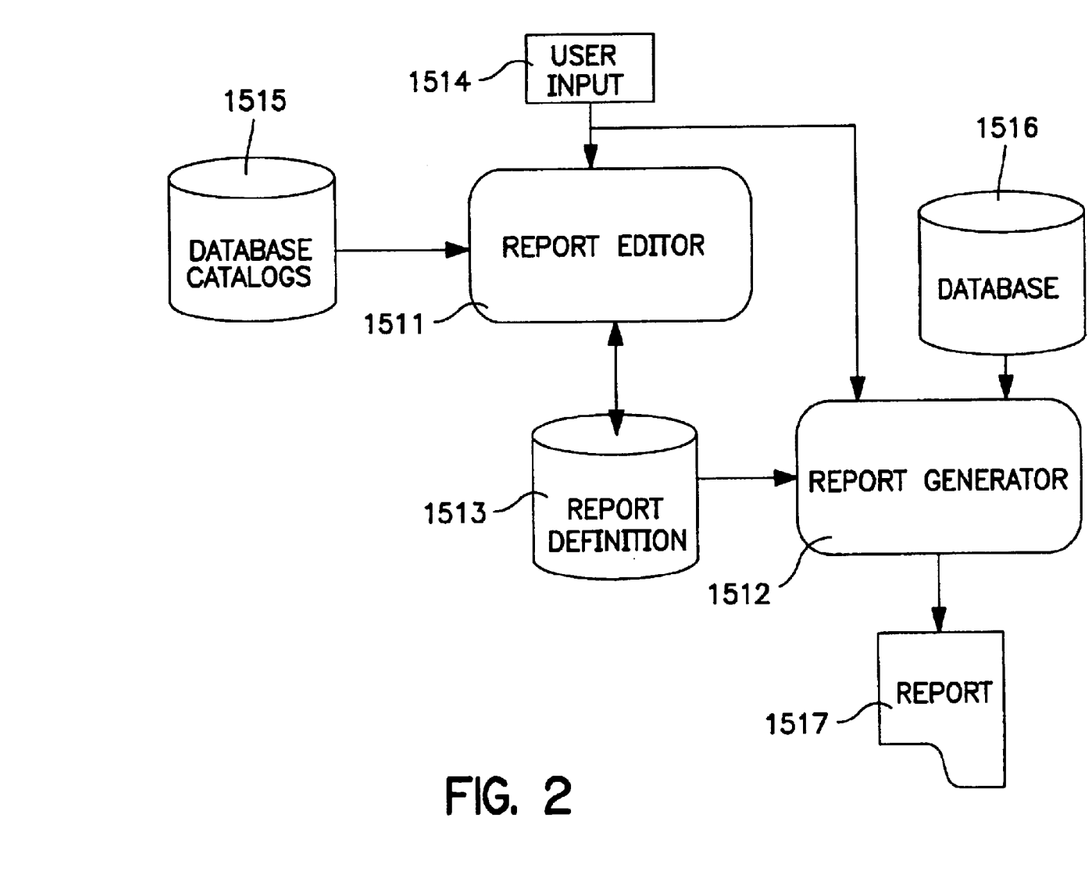
FIG. 2 is a graphical representation of the bill editor and generator module of the bill production processor according to the preferred embodiment.

With reference to FIG. 2 in conjunction with FIG. 1, there is shown an overall schematic of the report editor and generator module 151. The terms "bill" and "report" are used interchangeably and should be understood as such. The report editor and generator has two separate components which work together to generate a bill. The first, report editor 1511, is the portion of module 151 directed to generating the graphical layout of a bill or report on paper or a screen. The second, report generator 1512, is the portion of module 151 directed to the generation of report based on the instructions contained within report editor definition file 1513.

A user, at 1514, using a palette of tools defines the overall layout of the report. When a particular tool is specified, whether it is static, dynamic or paragraph text, the report editor 1511 accesses database catalogs 1515. The editor accesses the database catalogs to allow the user to choose the stored procedures which are run when the report is generated. In other words, the user 1514 selects the stored procedures to be used by the report for execution at a later time. Once the report is defined, it is stored in a report definition file (RDF file) 1513. The RDF file 1513 is a temporary memory which stores the overall layout of the bill, but not specific customer data.

When the billing personnel desires to run a bill, the report generator segment 1512 of the system is run. The report generator 1512 reads the RDF file 1513, which describes how the report it to appear, where in the database 1516 the customer data is stored and where to draw the data on the report. The report generator 1512 queries the database 1516 under the control of the RDF file 1513. The report generator 1512 pulls the data specified by the RDF file 1513, and prints it as a report 1517 in the manner specified by the RDF file 1512. The user can specify that instead of printing the information on paper, it can draw it in a window on a computer screen, or write it to a file on a disk, which can be accessed at a later time without having to go back to the database 1516.

Figure 3:
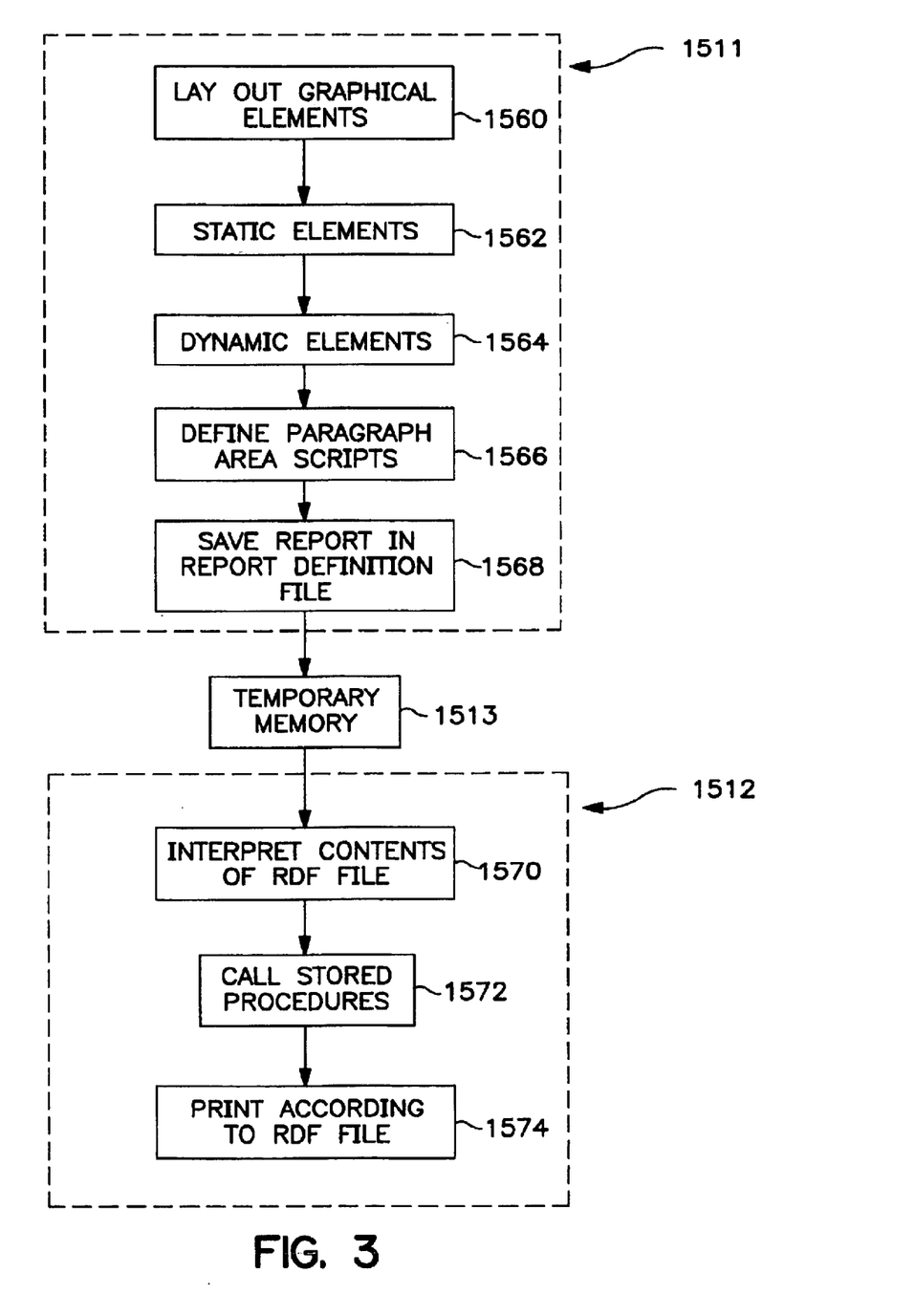
FIG. 3 is a flow representation of the bill editor and generator module according to the preferred embodiment.

With reference to FIG. 3, there is shown a schematic flow diagram of the steps used by the billing personnel to edit and generate a report. Report editor 1511 is first used to define the appearance of the report. Then, report generator 1512 is used to collect the appropriate information required by the report definition file 1513. In step 1560, the billing personnel lays out the graphical elements which will appear on the bill. These include static text elements of step 1562, which consist of unchanging text, such as field captions, labels, headings, etc. In addition, in step 1564, dynamic text elements are input by the billing personnel. Dynamic text is text that depends on a table column or some other variable quantity, such as the current date, the current time, and page number. As is well known in the art data in relational databases are organized in tables. For instance, the database may contain a customer table, which includes important information pertaining to the customer. Data in relational databases is generally organized in rows and columns. A specific customer in a customer table is typically represented in a single row, along which all of the information about that customer is stored. The columns of the customer table might include first name, last name, customer ID, current balance, etc., respectively.

Next, the billing personnel in step 1566 defines the paragraph area scripts. Paragraphs are generated within paragraph areas. A paragraph area appears within a larger paragraph. Each paragraph in the report is associated with a particular paragraph area in the report, and may only be generated within that paragraph area. A paragraph area is divided into one or more equal width columns. A paragraph associated with a given paragraph area has a width equal to the width of either the paragraph area or one of its columns. The order in which paragraphs are to be generated in the report and the stored procedures that are to be called to retrieve data are in a paragraph area script.

Paragraphs are generated within paragraph areas under the control of the script. Associated with each paragraph area is a paragraph area script, which constructs the paragraph area with the data obtained when the report generator 1512 queries the database 1516. The scripting language is preferably graphical, and there may or may not be textual representation of it. One example of a textual representation of the scripting language syntax is shown below. When all paragraph areas in a containing paragraph are full, and another paragraph is generated in one of the paragraph areas, another page is generated for the report.

Once the report is defined by static, dynamic and paragraph text, it is reduced to an RDF file at 1568 and stored in temporary memory 1513. At some later time, the billing personnel can generate the report. Upon instruction to do so from the billing personnel, the bill/report generator 1512 reads the RDF file 1513, which describes how the report is to appear and where the data is stored in database 1516. The report generator 1512 interprets the contents of the RDF file at step 1570 and at step 1572 has the database execute stored procedures. Finally, the report generator 1512 pulls the data specified by the RDF file 1513, and prints it in step 1574 in the manner specified by the RDF file 1513.

As is apparent from the foregoing, the RDF file is designed to provided support for specification of all manner of printed output, from traditional line-oriented reports, such as pay-per-view order summaries, to forms, such as bills and work orders. The RDF file features easy specification of repetitive or one-time outputs in units called paragraphs, with a natural connection to data sets modeled as the result sets of stored procedure calls to a relational database. Advantageously, RDF files are amenable to graphical editing.

The following is a listing of RDF syntax and semantics. It consists of an alphabetical listing of productions, each defining the allowable representations of some nonterminal. The syntax is presented in a very stylized form. Nonterminals are in angle brackets; terminals are in boldface. Pseudoterminals are in italics, and are explained following the syntax. Text from a dash to the end of the line is commentary. Repetition of zero or more symbols is denoted by braces. Alternation between symbols is denoted by a vertical bar. Numbers denoting origins and sizes are integer numbers of points, except where otherwise indicated. There are 72.27 points per inch.

With one exception, line breaks are significant in this syntax and appear where shown. The exception is : due to space limitations, the representation of  spans multiple lines, but in fact it must all appear on a single line. The distinguished symbol, i.e., the place to begin, is the nonterminal symbol <report>.

| | |
|---|---|
| <background color> | - *Color* |
| <binding> | - - an identifier denoting a data element (see Appendix A) |
| <columns> | - - number of columns in paragraph area |
| <dynamic text> | = DynamicText<br><binding> |

-continued

| | |
|---|---|
| | <ori x> <ori y> <width> <height> <justif> |
| | <background color> |
| | <foreground color> |
| | <font> |
| <element> | = <dynamic text> |
| | \| <line> |
| | \| <paragraph area> |
| | \| <picture> |
| | \| <rectangle> |
| | \| <rounded rectangle> |
| | \| <static text> |
| <font> | = *Font* |
| <foreground color> | - *Color* |
| <full width> | = - 1 if full width, 0 if column width |
| <grid size> | = - granularity of editing grid |
| <height> | - - height |
| <justif> | = - 0 if left, 1 if center, 2 if right |
| <landscape> | = - 1 if landscape, 0 if portrait |
| <line> | - Line |
| | <pt1 x> <pt1 y> <pt2 x> <pt2 y> |
| | <background color> |
| | <foreground color> |
| <margin bottom> | = - paper bottom margin |
| | (nonintegral number of points) |
| <margin left> | = - paper left margin |
| | (nonintegral number of points) |
| <margin right> | - - paper right margin |
| | (nonintegral number of points) |
| <margin top> | = - paper top margin |
| | (nonintegral number of points) |
| <ori x> | = - x coordinate of origin |
| <ori y> | = - y coordinate of origin |
| <overlap x> | - 0 |
| <overlap y> | = 0 |
|  | -  <paper type> |
| | <landscape> |
| | <poster> <paper width> <paper height> |
| | <margin left> <margin right> |
| | <margin top> <margin bottom> |
| | <scale mode> <scale x> <scale y> |
| | <overlap x> <overlap y> |
|  | = a |
| <paper height> | - - height of paper |
| | (nonintegral number of points) |
| <paper type> | = *PaperType* |
| <paper width> | - - width of paper |
| | (nonintegral number of points) |
| <paragraph> | = Paragraph |
| | <paragraph identifier> |
| | <full width> <height> |
| | <grid size> |
| | - number of elements |
| | { <element> } |
| <paragraph area> | = ParagraphArea |
| | <script> |
| | <columns> <ori x> <ori y> <width> |
| | <height> |
| | - number of paragraphs |
| | { <paragraph> } |
| <paragraph identifier> | - - a name uniquely identifying the paragraph |
| | within its paragraph area |
| <picture> | = Picture |
| | <ori x> <ori y> |
| | - number of picture lines |
| | { <picture line> } |
| <picture line> | - - 64 hex digits of Neuron Data image data |
| <poster> | = 0 |
| <pt1 x> | = - x coordinate of first point |
| <pt1 y> | = - y coordinate of first point |
| <pt2 x> | - - x coordinate of second point |
| <pt2 y> | - - y coordinate of second point |
| <RDR version> | = a |
| <rectangle> | = Rectangle |
| | <ori x> <ori y> <width> <height> |
| | <background color> |
| | <foreground color> |
| <report> | - Report |
| | <RDF version> |
| |  |

-continued

| | |
|---|---|
| | <paragraph area> |
| <rounded rectangle> | - RoundedRectangle |
| | <ori x> <ori y> <width> <height> |
| | <background color> |
| | <foreground color> |
| <scale mode> | = 3 |
| <scale x> | - 1 |
| <scale y> | = 1 |
| <script> | = - a paragraph area script (see Appendix A) |
| <static text> | = StaticText |
| | <text> |
| | <ori x> <orl y> |
| | <background color> |
| | <foreground color> |
| | <font> |
| <text> | = - static text |
| <width> | = - width |
| Color | = the name of a Neuron Data color resource |
| Font | - the name of a Neuron Data font resource |
| PaperType | = 1 US letter |
| | 2 US legal |
| | 3 US tabloid |
| | 4 US ledger |
| | etc. |

Associated with each paragraph area is a script, defining how each paragraph area is to be rendered. The syntax of paragraph area scripts is shown below. It uses the same stylized form as the above RDF syntax. The distinguished symbol (that is, the place to begin) is the nonterminal symbol <script>.

| | |
|---|---|
| <argument> | - <expression> |
| <data set> | = <data set identified { <argument> } |
| <data set identifier> | - *Identifier* |
| <expression> | - *Identifier* \| *Number* \| *String* |
| | \| <type> ( <expression> ) |
| <foreach statement> | = foreach <data set> |
| | { <statement > } |
| | end foreach |
| <paragraph identifier> | - *String* |
| <paragraph statement> | = paragraph <paragraph identifier> |
| <script> | - { <statement> } |
| <statement> | = <foreach statement> \| <paragraph statement> |
| <type> | = Integer \| Money \| String \| Time |
| *Identifier* | = a sequence of one or more letters, digits, |
| | underscores, and periods, beginning with |
| | a letter, and not matching any of the above |
| | boldfaced reserved words -- may denote a |
| | data element, as <data set |
| | identifier>.<column name> |
| *Number* | = a sequence of one or more digits |
| *String* | - a sequence of zero or more non-quote |
| | characters, in quotes |

When a paragraph area is to be rendered, the statements comprising its script are executed, in sequence. Execution of a paragraph statement simply consists of rendering its identified paragraph, at the next location within the paragraph area. Execution of a foreach statement consists of two actions:

1) Acquire the data set of the foreach statement. In online operation, this involves calling the identified stored procedure with the listed arguments. In offline operation, this involves reading the next data set from an input file, where the data set consists of a number of rows m, a number of columns n, n column names, and m rows of data, n columns per row.

2) For each row in the data set, execute the statements of the foreach statement, in sequence.

Figure 4:
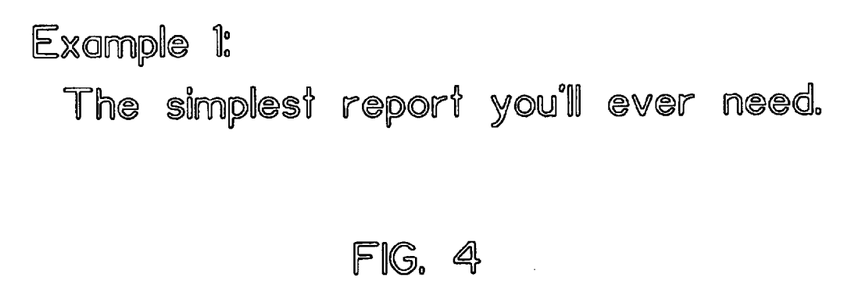
FIG. 4 depicts a message generated by the bill editor and generator according to the preferred embodiment.
Figure 5:
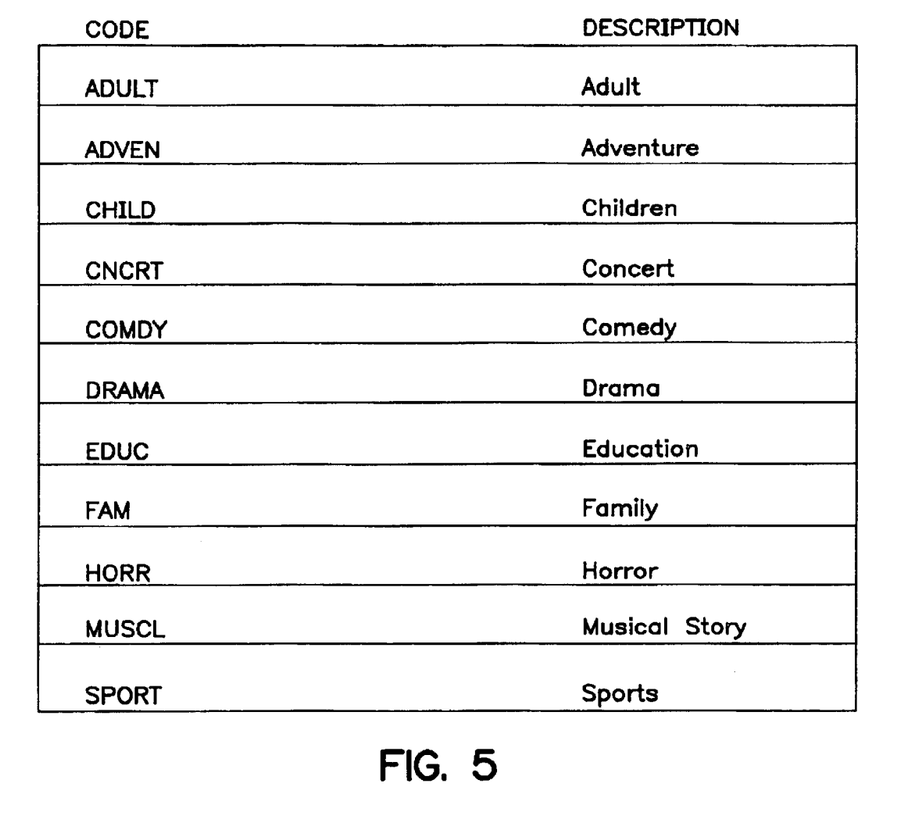
FIG. 5 depicts a table generated by the bill editor and generator according to the preferred embodiment.

Two examples of a typical RDF file follow. The reports specified by these examples are shown in FIGS. 4 and 5, respectively. The first example specifies a static message.

RDF:
```
  Report
  a
  a 1 0 0 614.295 794.97 72.27 72.27 72.27 72.27 3 1 1 0 0
  ParagraphArea
  paragraph "Paragraph 1"
  1 10 10 614 795
  1
  Paragraph
  Paragraph 1
  1 795
  6
  2
  StaticText
  Example 1:
  72 205
  Color.White
  Color.Black
  fonts.FontLarge
  StaticText
  The simplest report you'll ever need.
  72 229
  Color.Transparent
  Color.Black
  fonts.FontLarge
```

The next example, the output of which is shown in FIG. 5, displays data in a paragraph area contained within the top-level paragraph area. In online operation, the stored procedure lp_get_subject_cat is the source of the data elements subject_cat_cd and subject_cat_desc. In offline operation, they come from an input file such as the one following the example.

RDF:
```
  Report
  a
  a 1 0 0 614.295 794.97 72.27 72.27 72.27 72.27 3 1 1 0 0
  ParagraphArea
  paragraph "Paragraph 1"
  1 10 10 614 795
  1
  Paragraph
  Paragraph 1
  1 795
  6
  4
  StaticText
  Example 2
  205 96
  Color.White
  Color.Black
  fonts.FontLarge
  ParagraphArea
  foreach subject_cat paragraph "Paragraph 1" end foreach
  1 60 132 494 651
  1
  Paragraph
  Paragraph 1
  1 36
  0
  3
  Rectangle
  20 0 468 37
  Color.White
  Color.Black
  DynamicText
  subject_cat.subject_cat_cd
  54 18 10 1 0
  Color.White
  Color.Black
  Font.Normal
  DynamicText
  subject_cat.subject_cat_desc
  271 18 11 1 0
  Color.White
  Color.Black
  Font.Normal
  StaticText
  Code
  120 120
  Color.White
  Color.Black
  Font.Bold
  StaticText
  Description
  337 120
  Color.White
  Color.Black
  Font.Bold
```

Input File:
```
  subject_cat
  11 2
  subject_cat_cd subject_cat_desc
  ADULT|Adult
  ADVEN|Adventure
  CHILD |Children
  CNCRT|Concert
  COMDY|Comedy
  DRAMA|Drama
  EDUC|Education
  FAM|Family
  HORR|Horror
  MUSCL|Musical Story
  SPORT|Sports
```

Figure 6:
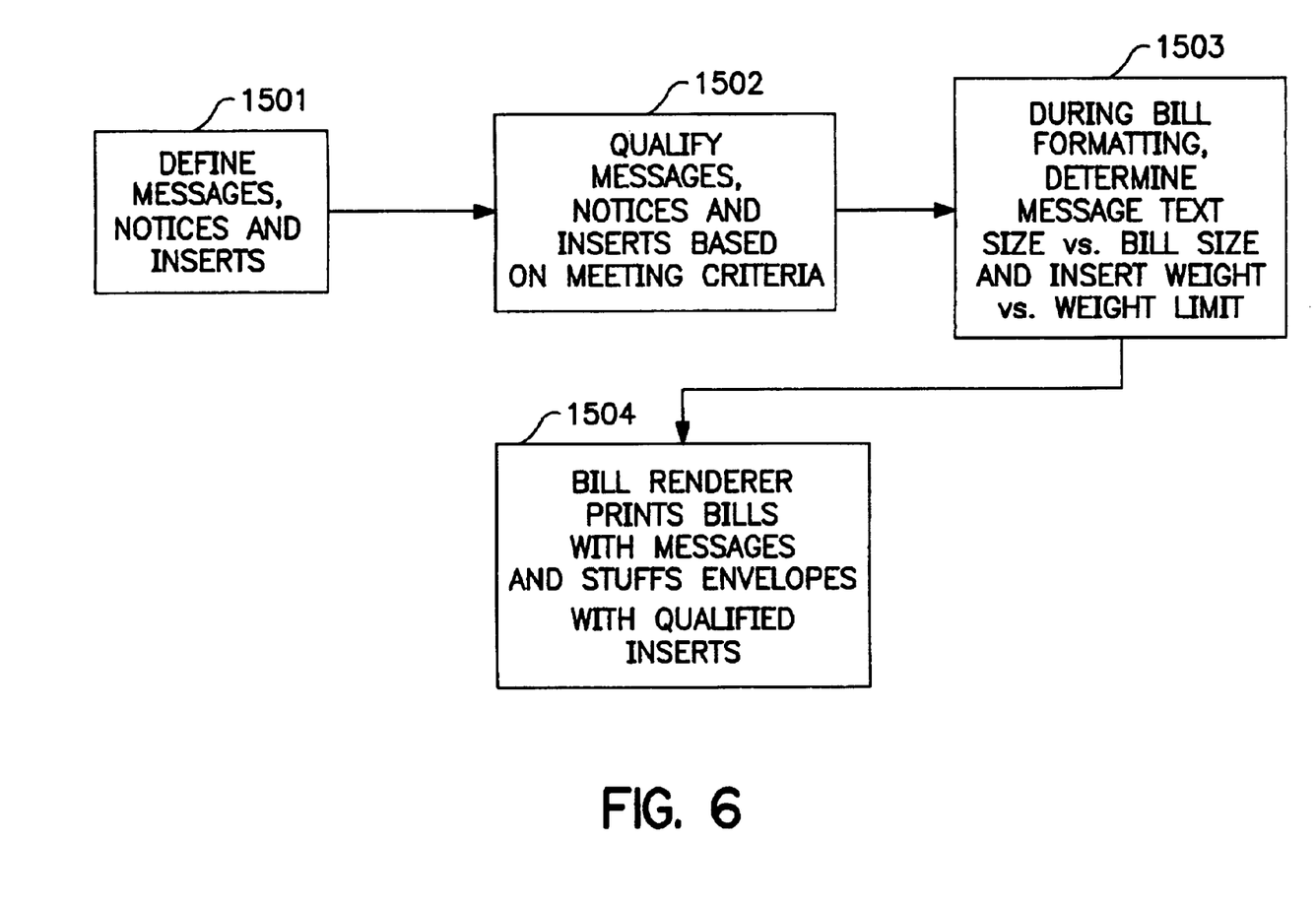
FIG. 6 is a high level flow diagram of the bill messaging and insert system according to the preferred embodiment.

With reference to FIG. 6 in conjunction with FIG. 1, there is shown a high level flow diagram of the bill messaging extraction module 152 and bill insert manager 153 according to the preferred embodiment. The bill messaging extraction module 152 determines the type of messages and notices that may be included on a customer billing statement. The bill insert manager 153 determines whether inserts, if any, should be included within the customer billing statement based on the total weight of the bill. In Step 1501 of the bill messaging, notices and inserts process of FIG. 6, the user first defines a universe of messages, notices and inserts which could be included in the customer billing statement. Step 1501 allows billing personnel to enter all relevant messages, notices and inserts for a particular billing cycle, of which only a small subset may eventually appear in any particular customer's billing statement. Thus, by initially inputting a universe of billing messages, notices and inserts, the billing personnel is relieved of having to generate customized billing statements for each customer.

In Step 1502, the universe of available messages are qualified for a particular customer, based on known criteria for that customer. If, of a universe of 50 messages, only 5 are relevant to, i.e., qualify for, a particular customer, the remaining 45 messages are discarded.

Next, the messages and inserts are analyzed in Step 1503 to determine whether they will conform to the particular format established for that bill run. A particular bill format is chosen, perhaps consisting of a single, folded page, which is perforated so that the bill may be separated into two sections, one of which is returned with payment. All of the qualifying messages may not fit on the customer billing statement. Step 1503 determines whether particular messages will indeed fit on the chosen format for the customer billing statement. For instance, in the case of messages, this means that, of 5 relevant messages, perhaps only 3 will fit on the final statement. Similarly, for notices, this means that only the most important notices will be included in the bill, but only if the total weight of the bill is equal to or less than a designated postal weight, e.g., one ounce.

Next, in Step 1504 all qualifying messages as specified through the formatting language transmitted to the bill renderer are printed and all qualifying inserts are stuffed into envelopes by the bill renderer.

Figure 7:
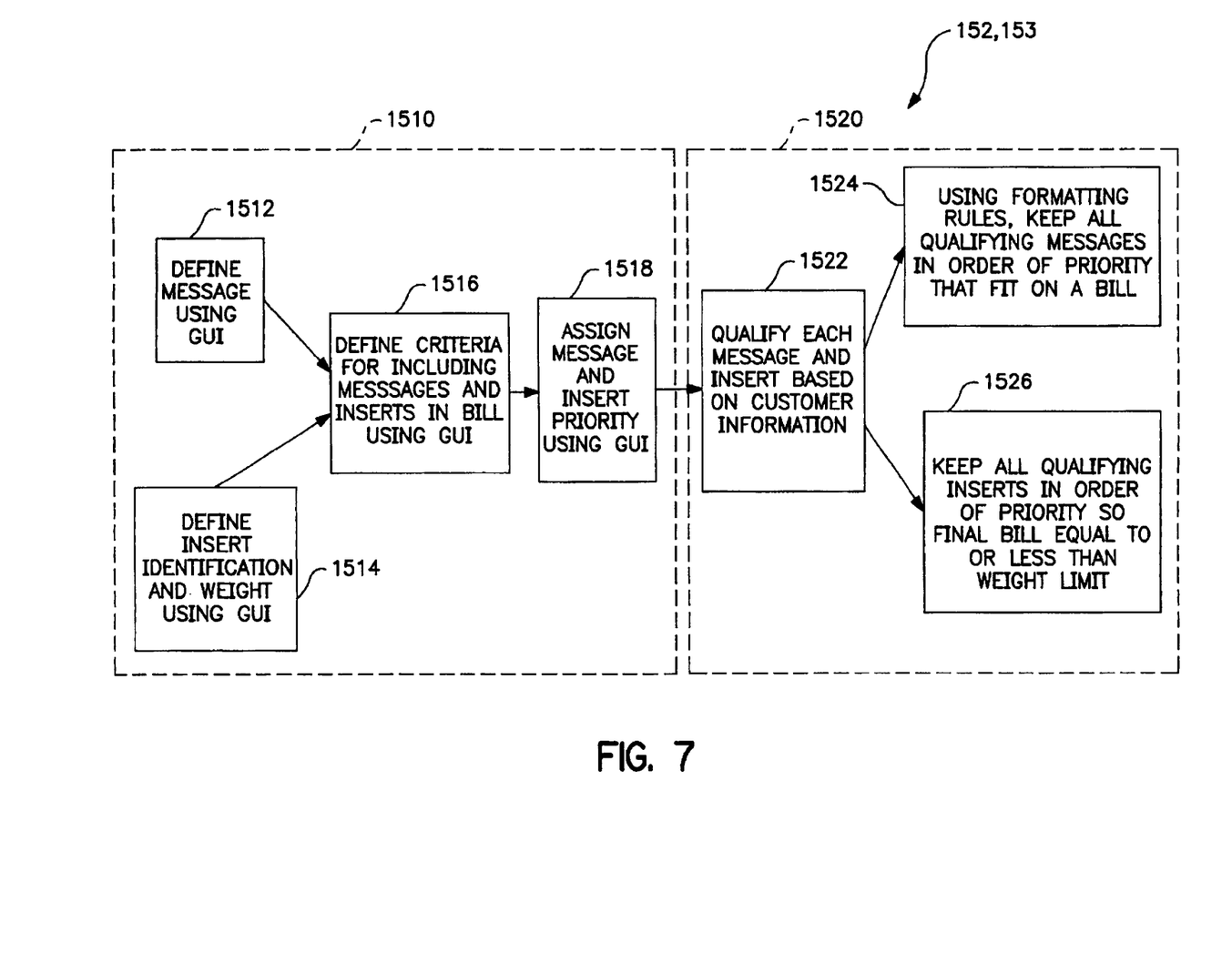
FIG. 7 is a detailed flow diagram of the bill messaging and insert system according to the preferred embodiment.

With reference to FIG. 7, there is shown a more detailed description of the bill modules 152, 153 according to the preferred embodiment. The system may be seen as having two operating segments, the bill definition segment 1510 and the bill run segment 1520, one following the other. In the bill definition segment 1510, the universe of possible messages and inserts are defined by the billing personnel. Once the universe of messages is determined, the bill run segment qualifies the messages for each customer and executes a prioritization to determine whether a particular message and/or insert will be included in the customer billing statement.

In Step 1512, the billing personnel defines for the billing period the universe of messages that could be included on any given billing statement without regard to individual customer information. The universe of messages are preferably input using a graphical user interface. Alternatively, an existing or flat file with a predefined universe of messages is accessed by the billing personnel, who then chooses which messages are to be included in the sub-universe of possible messages. The types of messages that might be included within the universe are varied. For instance, if a customer currently subscribes to HBO, one of the messages might include the promotion "Free Cinemax in the month of December for all HBO subscribers, Happy Holidays!" Alternatively, the messages might be notices or reminders. For instance, it might remind customers to call "1-800-DONTDIG" for assistance concerning where to dig on their property to avoid utility lines. Still further, the messages could be informational, such as informing customers of rate increases/decreases, informing customers of deadlines for solicitation of comments concerning changes in rules, advertising for an upcoming pay-per-view event, collections messages such as "your account is past due of $45.00, please pay immediately," etc.

In Step 1514, the billing personnel identifies for the billing cycle the universe of inserts which could be included in any given customer billing statement without regard to individual customer information. The universe of inserts are input using the graphical user interface. The types of inserts, like the types of notices, are varied. For instance, they could include advertisements, legal notices, promotional coupons for local business which have paid for advertising on any of the cable stations, schedule of televised events, etc.

After the universe of messages have been defined and identified, the billing personnel in Step 1516 defines criteria for determining which of the universe of messages, notices and inserts should be included in a particular bill run. The criteria is preferably defined by the billing personnel using the graphical user interface. Alternatively, the billing personnel could access a flat file having a listing of possible criteria, which are then chosen according to relevance to the bill run. The criteria of messages is diverse, and could include, for example, account information, collections history, product history, instructions to send messages and inserts to all customers, only to specified customers or some other subset of customers, instructions to send messages and inserts to those customers who have been late in remitting payment in the last three months, those in a certain zip codes, those subscribing to certain channels, etc., to name a few. The billing criteria is defined using traditional logic commands (AND/OR etc.) strung between the various commands associated with the particular criteria. For instance, the criteria for a message could be designed as "All customers in franchise tax area 8010 AND in bill cycle 4 AND (have HBO OR Cinemax)". The step of setting specified criteria for a bill run is particularly useful in the case where a limited bill run is scheduled for a segment of the franchise's customer base. The remaining segment of the franchise would thus be excluded from the bill run.

In Step 1518, the billing personnel assigns a priority to each of the messages, notices and inserts using, e.g., a scale of 1–10. This qualifies the importance of a particular message, notice or insert and the likelihood that it is included in a bill run. The higher the priority, the more likely a message, notice or insert will be included in a customer billing statement. For instance, government sanctioned legal notices would likely be assigned a relatively high priority, whereas advertising and promotional activities may be assigned a relatively lower priority. The billing personnel enters the priority of each of the messages, notices and inserts using the graphical user interface. With the conclusion of Step 1518, the bill definition segment 1510 is completed. No further input is required by the billing personnel.

The bill run segment 1520 then commences. In Step 1522, each message, notice and insert, are qualified against stored information for each customer. Only messages, notices and inserts which are relevant to each customer individually qualify for that customer. For instance, if messages informing customers of imminent repairs in certain zip codes are included in the bill run, customers of other zip codes do not quality and messages and notices are not sent to those customers in the non-qualifying zip codes. Alternatively, if Cinemax is offering a promotion, e.g., free Cinemax for customers with HBO, only those customers who currently subscribe to HBO, but not Cinemax, will receive the notice on their customer billing statement. It is possible that 50 or more messages, notice and inserts will have been defined, but only 5 or less qualify for a particular customer.

In Step 1524, all of the qualifying messages and notices are grouped together. Based on formatting rules, the messages and notices with the highest priority are designated to be printed on the bill first. As described previously in connection with the bill editor and generator module 151, different message areas are defined on the bill. The formatting rules dictate that the highest priority message that can fit into these areas are included on the bill. Since the bill is typically a single, perforated sheet, a limited amount of text space is available. If all of the available space on the customer billing statement has been allocated to messages and notices of relatively high priority, any remaining lower priority, un-printed messages are discarded. Alternatively, any of the remaining lower priority, un-printed messages may be stored in the customer's file for incorporation into the next billing run, and depending upon whether they are high enough in priority relative to the messages and notices for the next succeeding billing run and are not otherwise outdated, they may then be printed on the following customer billing statement.

In Step 1526, all of the qualifying inserts are grouped together. First class postage is typically limited to a specified weight limited, e.g., one ounce. Anything above this will require further postage fees. When it is considered that tens of thousands of customers must be sent customer billing statements every month, the cost of mailing customer billing statements becomes significant. Thus, any deviation above the weight limit of first class postage becomes economically significant on this scale. At the same time, however, if a number of inserts qualify for a particular customer, it is desirable to include as many inserts as possible without exceeding the first class weight limit. Thus, in Step 1526, the qualifying inserts are chosen based upon the assigned priority until the total weight of the bill is equal to or less than the prevailing weight limit of the preferred mailing class, i.e., one ounce in the case of first class postage. Any of the remaining lower priority inserts which are not included in the customer billing statement may be stored in the customer's file for incorporation into the next billing run, and depending upon whether they are high enough in priority relative to the inserts for the next succeeding billing run and are not otherwise outdated, they may then be included in the following customer billing statement.

Although the present invention has been described in detail, it should be understood that various changes, substitutions, and alterations can be made without departing from the spirit and scope of the invention as defined by the appended claims.

What is claimed is:

1. A system for automatically generating a customer billing statement for a plurality of customers, comprising:

means for creating a customer billing statement template having a message area;

means for storing in a database a plurality of billing messages each having an assigned priority;

means for defining criteria for determining which of the billing messages are to be included in a particular customer billing statement; and means for generating the customer billing statement for each of the plurality of customers comprising computer-executable instructions for selecting billing messages from the database based on the criteria and information specific to the customer being billed; arranging the selected billing messages based on their priority; and using only those selected billing messages that have the highest priority and that can fit within the message area when generating each customer billing statement.

2. A computer-readable media having instructions for use in automatically generating a customer billing statement for a plurality of customers; the instructions performing steps comprising:

creating a customer billing statement template having a message area;

storing in a database a plurality of billing messages each having an assigned priority;

defining criteria for determining which of the billing messages are to be included in a customer billing statement; and generating the customer billing statement for each of the plurality of customers by repeating the steps of:

selecting billing messages from the database based on the criteria and information specific to the customer being billed;

arranging the selected billing messages based on their priority; and using only those selected billing messages that have the highest priority and that can fit within the message area when generating each customer billing statement.

3. The computer-readable media as recited in claim 2, wherein the instructions further perform the step of using formatting rules to select billing messages that can fit within the message area when generating the customer billing statement.

* * * * *